No. 647,539. Patented Apr. 17, 1900.
J. C. TELLER.
APPARATUS FOR AMALGAMATING METALS.
(Application filed Feb. 4, 1899.)

(No Model.) 3 Sheets—Sheet 1.

Witnesses.
Harry Kilgore
F. D. Merchant

Inventor.
John C. Teller,
By his Attorney,
Jas. F. Williamson

No. 647,539. Patented Apr. 17, 1900.
J. C. TELLER.
APPARATUS FOR AMALGAMATING METALS.
(Application filed Feb. 4, 1899.)
(No Model.) 3 Sheets—Sheet 3.

Witnesses.
Harry Kilgore
F. D. Merchant

Inventor.
John C. Teller.
By his Attorney,
Jas. F. Williamson

UNITED STATES PATENT OFFICE.

JOHN C. TELLER, OF MINNEAPOLIS, MINNESOTA.

APPARATUS FOR AMALGAMATING METALS.

SPECIFICATION forming part of Letters Patent No. 647,539, dated April 17, 1900.

Application filed February 4, 1899. Serial No. 704,473. (No model.)

*To all whom it may concern:*

Be it known that I, JOHN C. TELLER, a citizen of the United States, residing at Minneapolis, in the county of Hennepin and State of Minnesota, have invented certain new and useful Improvements in Apparatus for Amalgamating Metals; and I do hereby declare the following to be a full, clear, and exact description of the invention, such as will enable others skilled in the art to which it appertains to make and use the same.

My present invention has for its object to provide an improved apparatus for amalgamating and collecting finely-divided metals whether in the form of vapor or in the form of so-called "float" or "flake" metal.

To these ends my invention consists of the novel devices and combinations of devices hereinafter described, and defined in the claim.

The invention is illustrated in the accompanying drawings, wherein like characters indicate like parts throughout the several views.

Figure 1:
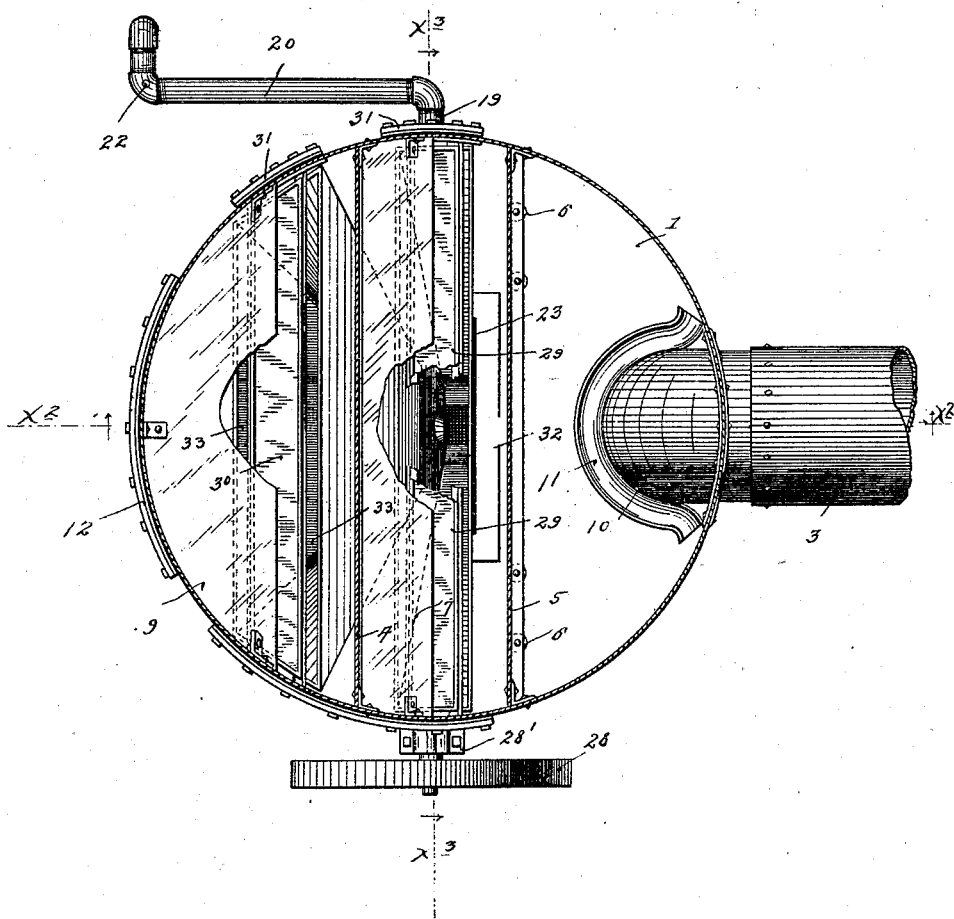
Figure 2:
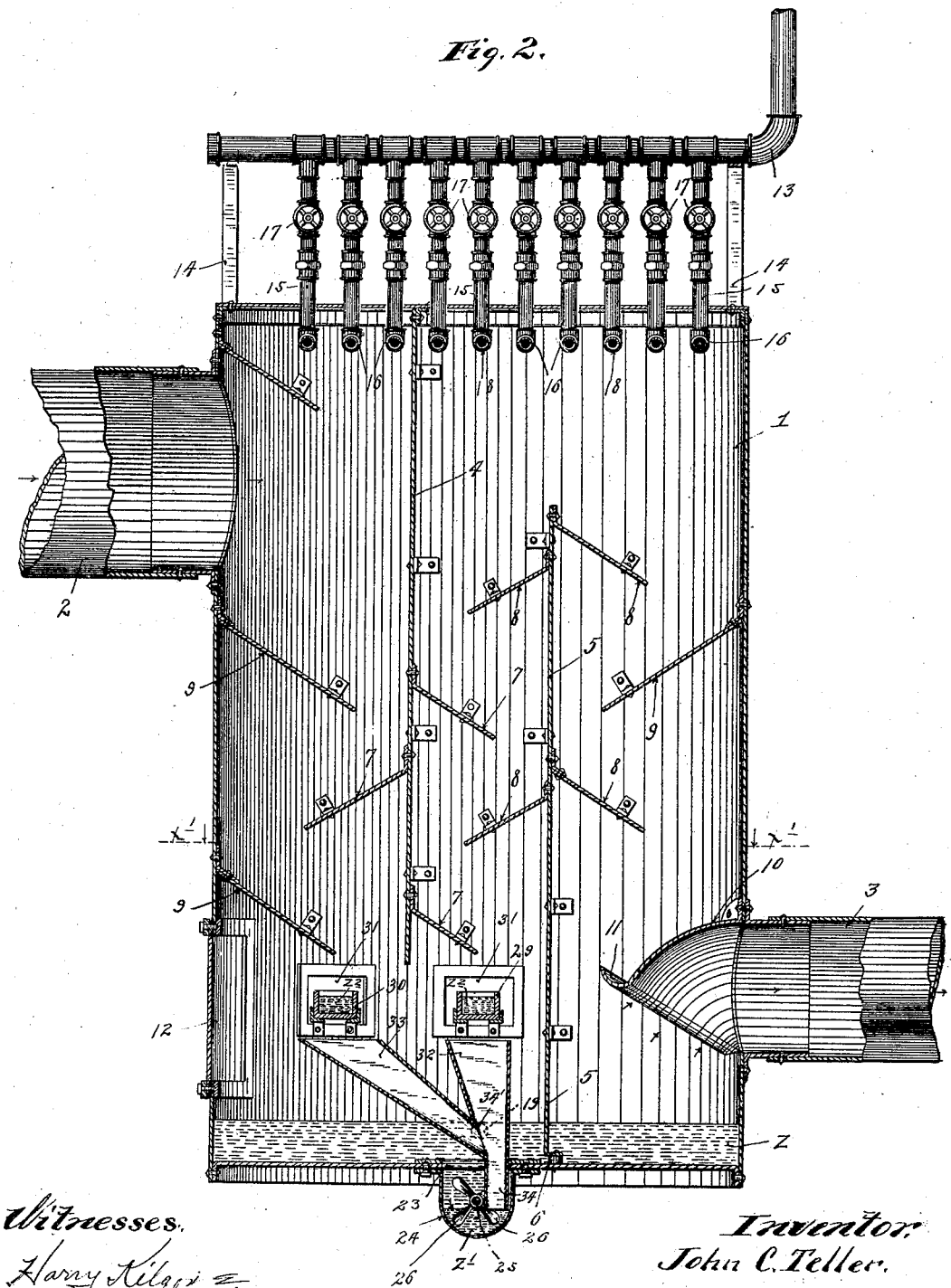
Figure 3:
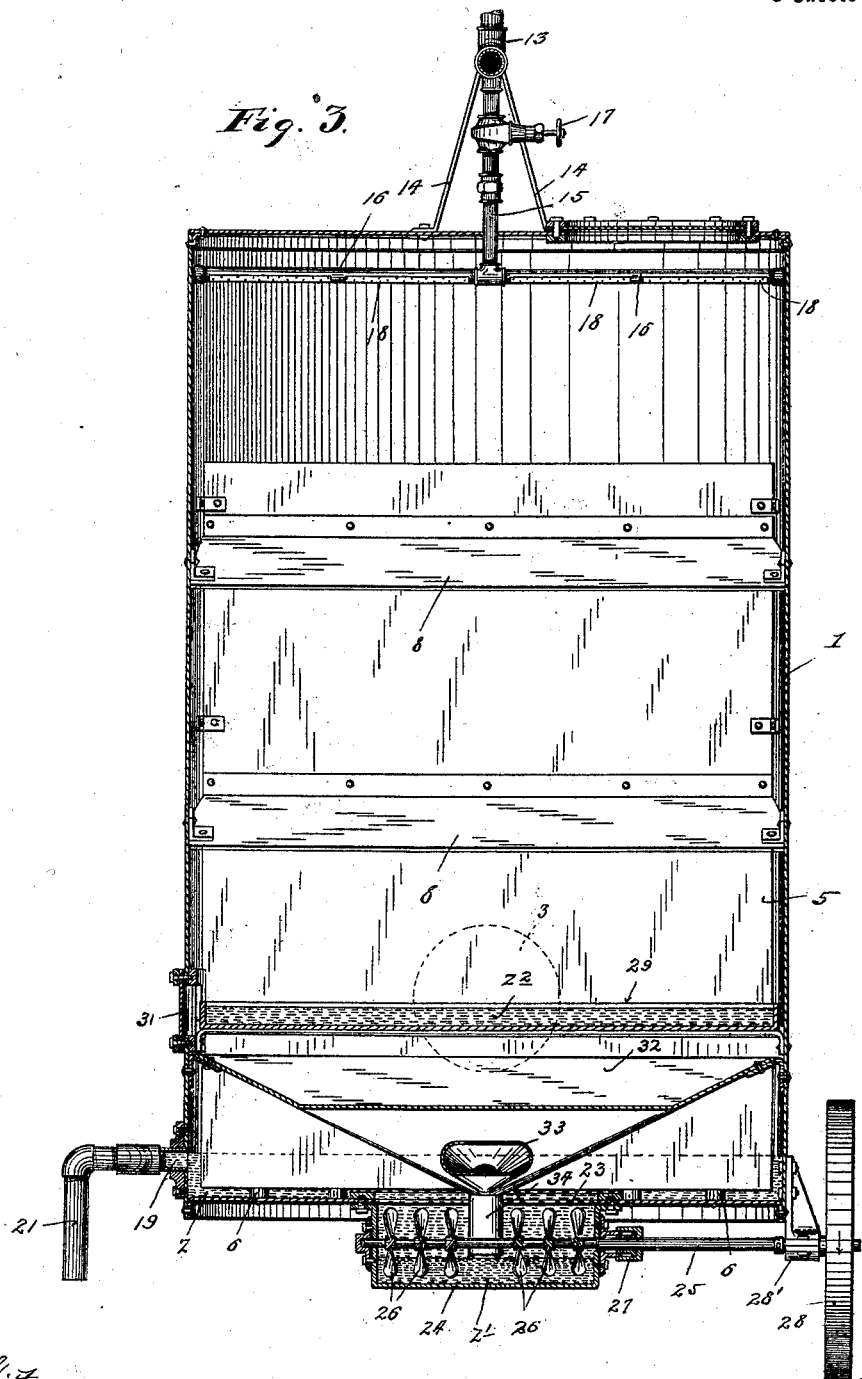

Figure 1 is a horizontal section taken approximately on the line $x'$ $x'$ of Fig. 2. Fig. 2 is a transverse vertical section taken approximately on the line $x^2$ $x^2$ of Fig. 1, some parts being shown in full; and Fig. 3 is a transverse vertical section taken approximately on the line $x^3$ $x^3$ of Fig. 1.

A collecting or condensing receptacle, which, as shown, is in the form of a vertically-disposed and approximately air-tight drum, is indicated by the numeral 1. The inlet tube or stack 2, which leads from the roasting-furnace or other receptacle in which the ore is treated by heat, opens into the upper portion of the drum or receptacle 1. An outlet tube or stack 3 opens from the lower portion of the drum 1.

Within the drum 1 is a pair of overlapped and vertically-disposed partition-plates 4 and 5, the former of which depends from the top of the drum and terminates short of its bottom and the latter of which rises from the bottom of the drum and terminates short of the top thereof. The bottom of the partition-plate 5 is spaced apart from the bottom of the drum 1 by thimble 6, so as to permit of the free circulation of the water, (indicated at $z$.) The depending partition-plate 4 is provided with downwardly-inclined baffle plates or blades 7, that project from its opposite sides, and the baffle-plate 5 is likewise provided with similar baffle-plates 8. The drum 1 is also preferably provided with downwardly-inclined baffle plates or blades 9. The coöperating baffle plates or blades 7, 8, and 9 overlap in zigzag order.

Within the drum 1 the outlet tube or stack 3 is provided with a downturned hood 10, the inner edge of which terminates in a gutter or channel 11, which runs out at the sides and lower portion of the said hood-section 10. The drum 1 is also shown as provided with a removable door or cover 12, that normally closes a manhole or opening through which access to the interior of drum 1 is permitted when the said door 12 is opened or removed.

As shown, the spraying device at the upper end of the drum 1 consists of a supply-pipe 13, supported from the drum by brackets 14 and provided with a series of depending branches 15, the lower ends of which terminate within the drum in parallel transversely-extended spraying-pipes 16. The depending branches 15 are preferably each provided with a valve 17. The ends of the spraying-pipe sections 16 are closed, and their under surfaces are provided with long slots which are covered by perforated metallic strips 18, that are soldered or otherwise removably secured thereto. This construction leaves the spraying-pipes 16 sufficiently strong and at the same time affords means whereby the perforations in the same may be varied simply by substituting sections 18 having the different perforations.

At one side and a little way above its bottom the tank 1 is provided with an overflow-pipe 19, and to the projecting end of this overflow-pipe 19 is swiveled a laterally-extended pipe-section 20, to the free end of which in turn a depending discharge-section 21 is swiveled. At its free end and upper side the pipe-section 20 is provided with a very small perforation or air-hole 22 for a purpose which will hereinafter appear.

The drum 1 is provided with an elongated passage 23 in the central portion of its bottom.
An approximately-semicylindrical pocket 24 is secured with a water-tight joint to the bottom of the drum 1 immediately below the passage 23. This pocket 24 contains a body of mercury or quicksilver, (indicated at $z'$.) Working within the mercury-pocket 24 is an agitator consisting of a shaft 25, provided with propeller-like blades 26. The shaft 25 is suitably mounted in the pocket 24 and works outward through a stuffing-box 27 at one end thereof, and at its outer end it is provided with a pulley 28 and, as shown, is further supported by a bearing 28', depending from the tank 1. A power-driven belt (not shown) runs over the pulley 28 to impart the rotary motion to the agitator. The propelling-blades 26, which stand on the opposite sides of the center of the pocket 24, are inclined in reverse directions, and the propeller is driven in the direction indicated by the arrows marked on Figs. 2 and 3, so that the mercury will be forced toward the center of the receptacle as it is agitated. In this preferred arrangement I place within the drum 1 a pair of mercury-pans 29 and 30, the former of which is suitably mounted below the lower edge of the lowermost baffle-plate 7 and the latter of which is located just below the lower edge of the lowermost left-hand baffle-plate 9. As shown, the drum 1 is provided with normally-closed openings 31, through which the mercury-pans 29 and 30 may be removed and placed in working position.

$z^2$ indicates mercury contained by the pans 29 and 30.

To catch the overflow from the mercury-pans 29 and 30, hoppers 32 and 33, respectively, are placed below the said pans. In this preferred construction the hoppers 32 and 33 are joined, as shown at 34', and are provided with a common depending spout or discharge-section 34, which extends into the mercury-pot 24 and terminates approximately at or slightly below the surface of the mercury $z'$.

Operation: By means of a suitable fan or other device for forcing air the air and gases from the roasting-furnace laden with the vaporized or float metal, which we will assume for the purposes of illustration to be gold, are forced into the collecting drum or receptacle 1. Preferably this is accomplished by suction produced in the discharge-tube 3. When the gold-laden air and gas are delivered to the receptacle 1, their temperature will be very high. Water is caused to drip in finely-divided streams through almost the entire interior surface of the drum, this of course being accomplished by opening the valves 17 of the spraying device. This action of the water of course rapidly cools the gas and air and causes the precipitation of the gold, and, furthermore, the water will collect a very large portion of the metal by its direct contact therewith. The metal-laden gas and air in passing through the receptacle 1 are caused to take a zigzag course, first downward, then upward, and then again downward, and is constantly being brought into contact with the baffle-plates or deflecting-leaves, onto which water is constantly dropping. By this action the gas and air will be thoroughly cooled before they reach the discharge side of the tank 1, and all of the gold or other metal with which they were originally laden will be precipitated with the water. The water laden with the gold will be dropped or discharged from the baffle-plates 7 and 9, which stand, respectively, above the troughs or pans 29 and 30, onto the mercury $z^2$, and by this mercury a considerable portion of the gold will be caught and held. The gold-laden water will then overflow the pans 29 and 30 and by the hoppers 32 and 33 and discharge-spout 34 will be delivered to the mercury $z'$ contained in the pocket 24. All this time the rotary agitator 25 26 is kept in motion, and under the action of the agitating-arms 26 the mercury is kept in a state of agitation and is constantly mixed or commingled with the metal-laden water which is discharged from the spout-section 34. By this action all particles of the finely-divided gold or other metal are positively forced into contact with the mercury and none is permitted to escape.

By dropping metal-laden water onto a body of mercury or quicksilver only a portion of the metal may be secured and held by the mercury under the process of amalgamation; but by positively mixing and commingling said metal-laden water with the mercury the process of amalgamation is, as before stated, rendered certain and complete.

It is preferable to hold a considerable body of water above the body of mercury, so that the above-described agitating action will take place entirely below the surface of the water, thereby preventing splashing of the mercury. By means of the adjustable discharge device 19 20 21 the level of the water in the bottom of the tank 1 may be varied. For example, if the free end of the section 20 is raised above its horizontal position the water in the tank 1 will seek the level of the air hole or vent 22. The depending section 21 serves to deliver the water into a suitable catch-receptacle or other device, and this section, as previously stated, is swiveled, so that it may always be set in a vertical position. The vent-perforation 22 prevents the section 21 from having a siphon action. All of the gold or other metal will be deposited or precipitated on the left-hand side of the partition-plate 5; but some of the water will be dropped on the right-hand side of said partition-plate 5. The water dropped from the right-hand baffle-plates 8 and 9 will to a considerable extent be dropped onto the hood-section 10 of the discharge pipe or stack 3, and from thence will run into the gutter or channel 11, by which it will be directed downward and toward the sides of the said hood, and there discharged at points where the draft is not strong. This prevents the draft in the stack 3 from drawing the water with it or from the tank 1.

What I claim, and desire to secure by Letters Patent of the United States, is as follows:

In an apparatus for collecting and amalgamating finely-divided metals, the combination with an amalgamating-receptacle, of a tube or spout delivering the metal-laden fluid to the intermediate portion of said receptacle, and an agitator mounted to rotate within said amalgamating-receptacle, said agitator having inclined propelling or agitating blades, the blades on the opposite sides of the delivery end of said spout or tube being reversely inclined, whereby the mercury and metal-laden fluid may be commingled under agitation and forced toward the said delivery tube or spout, substantially as described.

In testimony whereof I affix my signature in presence of two witnesses.

JOHN C. TELLER.

Witnesses:
W. W. HEFFELFINGER,
JAS. F. WILLIAMSON.